United States Patent
Oko, Jr. et al.

(10) Patent No.: US 6,947,966 B1
(45) Date of Patent: Sep. 20, 2005

(54) SYSTEM AND METHOD FOR INFLUENCING DYNAMIC COMMUNITY SHARED ELEMENTS OF AUDIO, VIDEO, AND TEXT PROGRAMMING VIA A POLLING SYSTEM

(75) Inventors: Frederick J. Oko, Jr., Reston, VA (US); Qiyue Sun, Reston, VA (US)

(73) Assignee: Road Runner HoldCo LLC, Herndon, VA (US)

(*) Notice: Subject to any disclaimer, the term of this patent is extended or adjusted under 35 U.S.C. 154(b) by 651 days.

(21) Appl. No.: 09/688,281

(22) Filed: Oct. 13, 2000

(51) Int. Cl.[7] .............................................. G06F 15/16

(52) U.S. Cl. .................. 709/203; 235/51; 235/382; 345/733; 705/12; 705/69; 706/46; 707/3; 707/102; 709/206; 725/24; 725/111; 725/114; 725/116

(58) Field of Search ............................... 709/204, 206, 709/207; 705/12

(56) References Cited

U.S. PATENT DOCUMENTS

| | | | |
|---|---|---|---|
| 4,290,141 A | * | 9/1981 | Anderson et al. |
| 4,305,131 A | | 12/1981 | Best ........................... 364/521 |
| 4,569,026 A | | 2/1986 | Best ........................... 364/521 |
| 4,591,248 A | | 5/1986 | Freeman ...................... 352/133 |
| 4,974,252 A | | 11/1990 | Osborne ....................... 379/92 |
| 5,465,384 A | | 11/1995 | Bejan et al. ................... 455/2 |

(Continued)

FOREIGN PATENT DOCUMENTS

WO    WO 94/13105    6/1994

OTHER PUBLICATIONS

W. H. Hilf, 1996. Beginning, Middle, and End—Not Necessarily in That Order. http://www.cybertown.com/hilf.html.
Excite Turns Couch Potatoes Into Real-time On-line Judges with National Television Event. http://www.corp.excite.com/news/excite/022998cbs_skate.html. (1998).
S. Allmon. 2000. Soon Viewers May Be Able to Choose a TV Show's Plot Twist or Its Moral Content. http://www.accesswaco.com./auto/feed/living . . . 2000/06/16/961188328.22049.4158.0159.html.

(Continued)

Primary Examiner—Hosain Alam
Assistant Examiner—Michael Won
(74) Attorney, Agent, or Firm—Roberts Abokhair & Mardula LLC

(57) ABSTRACT

A system and method for interactively affecting the course of a program or programming content. Viewer purchase electronic tokens which can be used to vote on the sequence of content in a broadcast whether it be audio, video or a combination thereof. Users are periodically polled by a server to vote on the direction that a broadcast is taking. The broadcast is then modified with real-time or stored content based upon the polling results from the viewers. Thus communities of voters have a chance to vote on the direction of content. The invention also allows sub-communities to be formed to pre-vote on a broadcast so that the sub-community can possible vote as a bloc on the direction and content of programming that is presented.

33 Claims, 5 Drawing Sheets

U.S. PATENT DOCUMENTS

| | | | | |
|---|---|---|---|---|
| 5,737,527 | A | | 4/1998 | Shiels et al. ........... 395/200.09 |
| 5,758,257 | A | * | 5/1998 | Herz et al. |
| 5,795,228 | A | | 8/1998 | Trumbull et al. ............. 463/42 |
| 5,796,393 | A | * | 8/1998 | MacNaughton et al. |
| 5,848,934 | A | | 12/1998 | Shiels et al. ................... 463/9 |
| 6,064,971 | A | * | 5/2000 | Hartnett |
| 6,108,644 | A | * | 8/2000 | Goldschlag et al. .......... 705/69 |
| 6,308,328 | B1 | * | 10/2001 | Bowcutt et al. |
| 6,457,045 | B1 | * | 9/2002 | Hanson et al. |
| 6,507,865 | B1 | * | 1/2003 | Hanson et al. |
| 6,523,063 | B1 | * | 2/2003 | Miller et al. |

OTHER PUBLICATIONS

Ford Ads to Ask viewers to Choose Outcome of Commercials via Internet. http://www.auto.com/autonews/cwird29 20000229.htm. (2000).

Internet Movie Lets Viewers Twit the Plot. http://arol.arabia.com/article/print/0,4973,22724,00.html. (2000).

J. Szadkowski. 1998. Pick a Dream, or Nightmare: BDE Lets You Tailor the Plot. http://library.northernlight.com/BM1998061601000076495.html (abstract only).

Paying to Vote. http://library.northernlight.com/BM19990524050039098.html. (1999).

Web search results dated Aug. 13, 2000. http://www.northernlight.com.

Websearch results dated Aug. 16, 2000. http://www.altavista.com.

Web search results dated Aug. 16, 2000. http://www.northernlight.com.

Web search results dated Aug. 16, 2000. http://www.google.yahoo.com.

* cited by examiner

SYSTEM AND METHOD FOR INFLUENCING DYNAMIC COMMUNITY SHARED ELEMENTS OF AUDIO, VIDEO, AND TEXT PROGRAMMING VIA A POLLING SYSTEM

FIELD OF THE INVENTION

This invention relates generally to dynamic creation of video programming. More particularly, the present invention comprises a system and method for allowing a community of individuals to influence the outcome of video programs.

BACKGROUND OF THE INVENTION

The Internet has lead many computer users to desire a highly interactive environment. This has spilled over into the cable environment as well where interactive set top boxes have begun to appear. This type of interaction enhances the experience of the viewer and makes such viewing more pleasurable.

Interaction of viewers with programming has been the subject of various developments. For example, U.S. Pat. No. 5,737,527 to Shiels, et al., assigned to U.S. Phillips Corporation, (the '527 patent) describes branch-structured narrative entertainment. It includes both standalone entertainment devices as well as broadcast and subscription services. The narrative branches to different story line paths based upon viewer responses to prompts.

U.S. Pat. No. 5,737,527 describes the ability of a viewer to vote on the direction of a broadcast. U.S. Pat. No. 5,848,934 to Shiels, et al. (the '934 patent) describes a branch-structured narrative entertainment. The narrative branches to different story line paths based upon "modified attribute values." However, neither the '527 patent nor the '934 patent describe or teach means for a community of participants on a network to influence the programming on the network in real time or near real time.

U.S. Pat. No. 4,305,131 to Best. (the '131 patent) describes an interactive entertainment system incorporating a speech recognition system in which the viewer is treated as a character in the narrative of a motion picture.

U.S. Pat. No. 4,569,026 to Best (the '026 patent) is a Continuation in Part (CIP) of U.S. Pat. No. 4,305,131 to Best. The '026 patent describes an interactive entertainment system incorporating a speech recognition system in which the viewer is treated as a character in an interactive video game story. At branch points in the picture, the viewer makes voice responses to audio questions (or asks questions).

U.S. Pat. No. 4,974,252 to Osborne (the '252 patent) describes a commercial/entertainment network for interactive communications between separate theatres and a remote broadcast center in a fashion to reduce required interconnecting bandwidth while still providing near real time updates of polling results to viewers.

U.S. Pat. No. 4,591,247 to Freeman (the '248 patent) describes a movie changeover system capable of providing real time decision tree movie presentations. Movie content depends on viewer response to branching choices.

U.S. Pat. No. 5,795,228 to Trumbull, et al. (the '228 patent) describes a system for interactive-computer shows that are directed by individual users through a networked entertainment system.

Interactive Entertainment Article by William Homer Hilf describes branching narrative movies shown to viewers who can "vote" for various outcomes using buttons attached to their theatre seats.

These references all indicate the desire of viewers and program decision makers to have viewers involved in the programming process.

As previously noted, network user interaction in the audio, video, and media (collectively referred to herein as "content") marketplace generally is increasing. Using the Internet as but one example, currently network users can select the types of news which the particular network user may wish to see. Systems such as Pointcast and Yahoo all allow the configuration of news articles for a particular network user. Similarly, communities of individuals can provide guidance concerning the development of episodes in a television show. For purposes of this invention a "community" is a collection of people having access to the same point of view or potentially different points of view of the same media asset or interactive environment. These media assets are being referred to as "shared elements." This type of interaction is exemplified in itsyourmovie.com. Indeed, on Broadway, certain plays and musicals have allowed the audience to select who would be the villain or what would be the outcome of a particular play.

Such flexibility has not typically been available over cable television networks or other interactive community or broadcast type networks.

What is therefore desired is a system and method for allowing a community of participants on a network be it audio, video or text based interaction, (collectively network users) network users to be able to influence the programming on the network in real time or near real time.

SUMMARY OF THE INVENTION

It is therefore an objective of the present invention to allow network users to have their opinions counted toward the outcome of broadcast content on a network.

It is yet another objective of the present invention to allow network users to vote via an interactive mechanism to affect the outcome of a broadcast program.

It is yet another objective of the present invention to provide for a revenue stream for a system operator based upon a "pay to vote" system.

It is still another objective of the present invention to allow network users network users to purchase voting "tokens" of different values indicative of the weight of the vote to be used by network users in influencing the outcome of a particular broadcast. It is a further objective of the present invention to provide a synchronized poll with every broadcast to allow network users at any given point in the broadcast to influence the next video segment in a broadcast.

These and other objectives of the present invention will become apparent to those skilled in the art from a review of the specification and detailed description that follows.

The present invention allows for a community of network users on a broadcast system to affect the outcome of content that is broadcast on the system. Such network users can be, for instance, listeners to an audio broadcast, network users of a video broadcast, those using wireless fixed and hand-held devices and participants in a chat session on the Internet. All such individuals are referred to herein as "network users." Similarly the term "broadcast center" as used herein means the central location from which the audio, video text or on-line interactive session originates. Through interactive means available such as a set top box or, when video content is broadcast via PCs, interaction can take place via the PC interface that network users can notify the broadcast service of their desires for a particular program or the outcome of that program.

Using the broadcast interface, network users can cast votes which are then transmitted to the broadcast center as to how the network users desire a particular broadcast program to go. For example, a community of network users may desire to have a particular type of ending (sad or happy) to occur for a particular broadcast. In the event of a program that is broadcasting an interview, network users may wish a particular interview to continue for a longer period of time, or truncate a particular interview and move on to a new topic. These and other types of outcomes will be discussed below. Of most importance to the present invention is the ability of a community of network users to influence the direction of a particular broadcast.

Using the present invention, a network user registers with the broadcast system, be it a cable TV system or other type of broadcast system in a normal fashion. The network user is offered the ability to purchase vote tokens which are charged to the network users account. For example, each token may be worth fifty cents. Alternatively, the network user can purchase tokens which are worth multiple votes, for example, a ten-vote token for five dollars. Further, a network user can pay for various levels of network user interaction. For example, a network user may be a normal network user, a "gold" network user, or a "platinum" network user with each different level of network user having different weights for the vote for each network user. The network user would pay an additional premium for having an increased weight associated with the network user vote. All network users in the same class may start with a fixed set of tokens upon initiation of service subscription or at the beginning of a particular program.

During the course of a particular program, network users are offered the opportunity to influence the direction of a broadcast by virtue of periodic polls of network users being offered. Thus, during the course of a program or at a commercial break, individual network users are offered the opportunity to cast a vote regarding how the network users would like the program to proceed. All the votes are counted and, in a typical case, the majority of votes or the distribution of votes based on an algorithm will dictate the direction in which the program will proceed. Results of the vote count are presented to all the network users so that they can understand why the program is moving in the direction that it is. Thereafter, the program proceeds in the direction that is voted by the majority of the network users. The real time feedback of voting status can also be provided to allow users to decide if they want to vote more or higher value tokens to potentially control the outcome towards their preference. Additionally the feedback of community voting status may be masked from the community for applications desiring blind voting.

Thus, the outcome of any particular vote is shared amongst all the members of the community, rather than having a single network user select how a particular program is to be presented to that single network user. Thus, a shared experience is created in the broadcast media. In short, the present invention is a subscription type, token-based service that allows for the voting of individual network users to have an influence over the direction of broadcast media.

The present invention offers a number of advantages. For the network user, an opportunity to influence the path of broadcast media is presented. A community of network users can vote on the direction desired and the broadcast content will follow that path. The vote associated with the path will be presented to all network users so that a sense of community can be developed.

For content producers, such a system offers the enhancement and encouragement of network users to view a particular program a number of times. Since the replay of a particular broadcast can vary each time that broadcast is made, producers of the broadcast can look forward to increased network users participation even at replays. Since the end result is different, network users will be drawn to view particular broadcasts more than one time. Content providers can also increase network user participation by allowing the polls to discover all possible paths and sequences through the content resulting in some rare paths being under great demand by a set of network users.

For live programs, producers of such a live program can have network user interaction in a more effective way. Thus, if a particular interviewer is conducting an interview that does not hold network user interest, rather than the network users leaving the broadcast entirely the network users can influence the broadcast, notify the producer that a particular interview should end, and that the subject matter should change. Thus, network users are more likely to stay with a particular program since they can, in part, control the content and thus, ratings for the particular program will increase.

Certain network users can pay to have a greater influence on the outcome, thus enhancing their experience and providing additional revenue to the system provider. Since the service is a pay service, one person cannot vote more than one time unless the person pays for each vote.

The system and method of the present invention will be further understood by reference to the detailed description that follows.

DETAILED DESCRIPTION OF THE INVENTION

Figure 1:
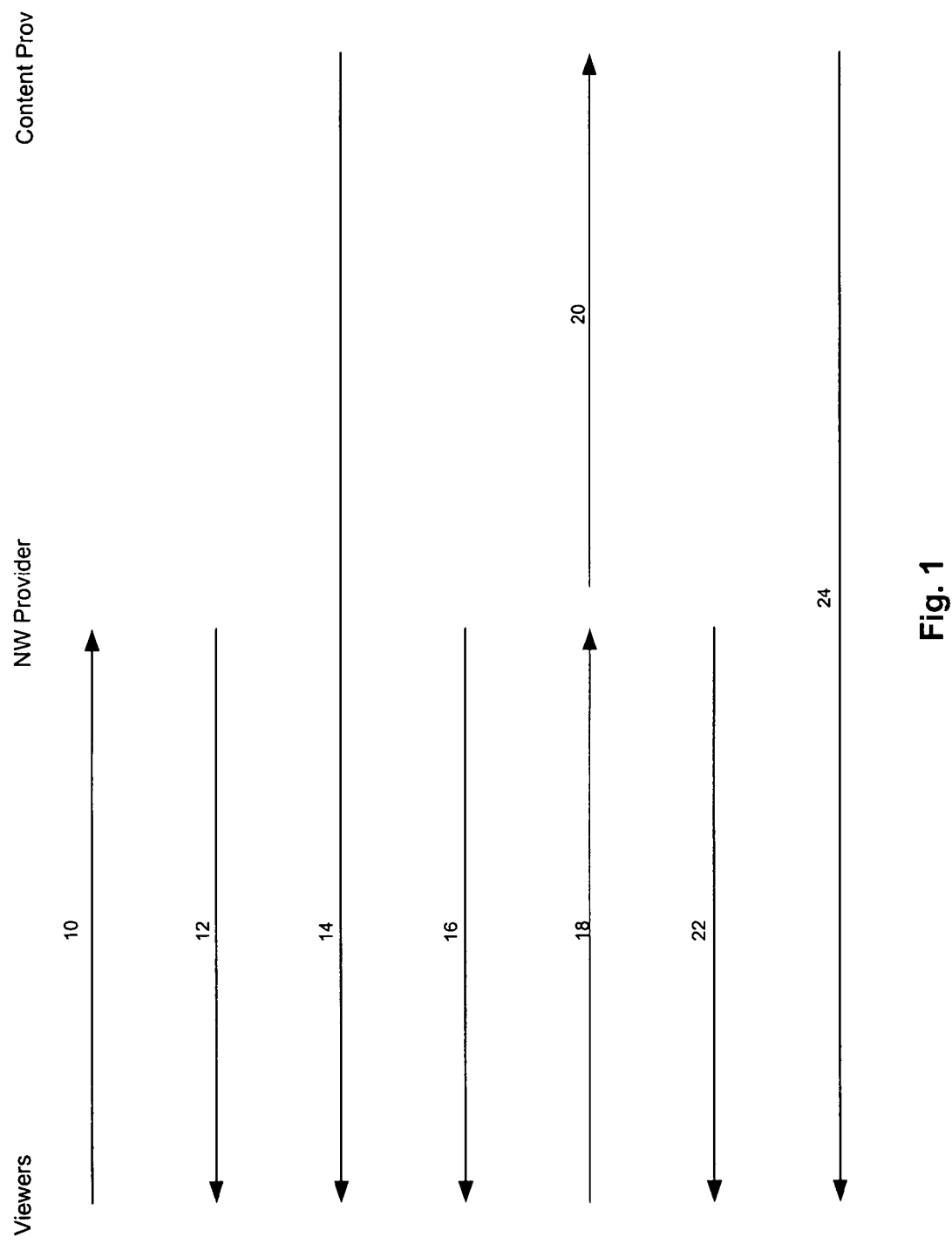
FIG. 1 illustrates the communication exchange of the present invention.

As used in this Application, the term "broadcast content" may comprise a live performance, a pre-recorded performance, and an interactive game that is broadcast over a broadcast means such as a television broadcast network, a cable broadcast network, and the Internet. As noted above, the present invention is a system and method for allowing a community of network users to influence the outcome of programming. Referring to FIG. 1, the communication exchange of the present invention is illustrated. Network users register 10 with a network provider and request tokens that allow the network user to vote in any particular poll that the network user desires. The network provider provides the tokens 12 to the network users for subsequent use. As will be noted below, the number of tokens and the charge for those tokens are all made in the usual accounting that is known in the art and occurs with normal content systems such as cable television and the like. Content providers thereafter provide content 14 to network users for subsequent viewing. The network provider provides the various poll questions 16 to the network users for subsequent voting regarding the content. Additionally these polls may be inserted in-band into the program stream from the content provider, Network users can then vote 18 by using the tokens that have been provided to the network users and will vote based upon the poll questions 16 that have been provided during the course of the content. That vote 18 is provided to the network provider that tallies the vote and provides the vote results 20 to the content provider for subsequent modification of the content. In addition, the poll results are separately provided 22 to the network users so that the network users can see how their respective community of network users voted on the particular poll in question. Longer duration polls 16 may be ongoing while feedback to network users 22 occurs so that each member of the community has visibility into the shared dynamic and the opportunity to contribute to or control the dynamics of the community based on response from other community members. This is a desirable feature when the members of the community are not in visual or aural communication with each other and provides a way to have many of the same responses and interactions as they would if they were in the same room. After the poll results had been made available to he content provider, the content provider then provides modified broadcast content 24 to the network users.

Figure 2:
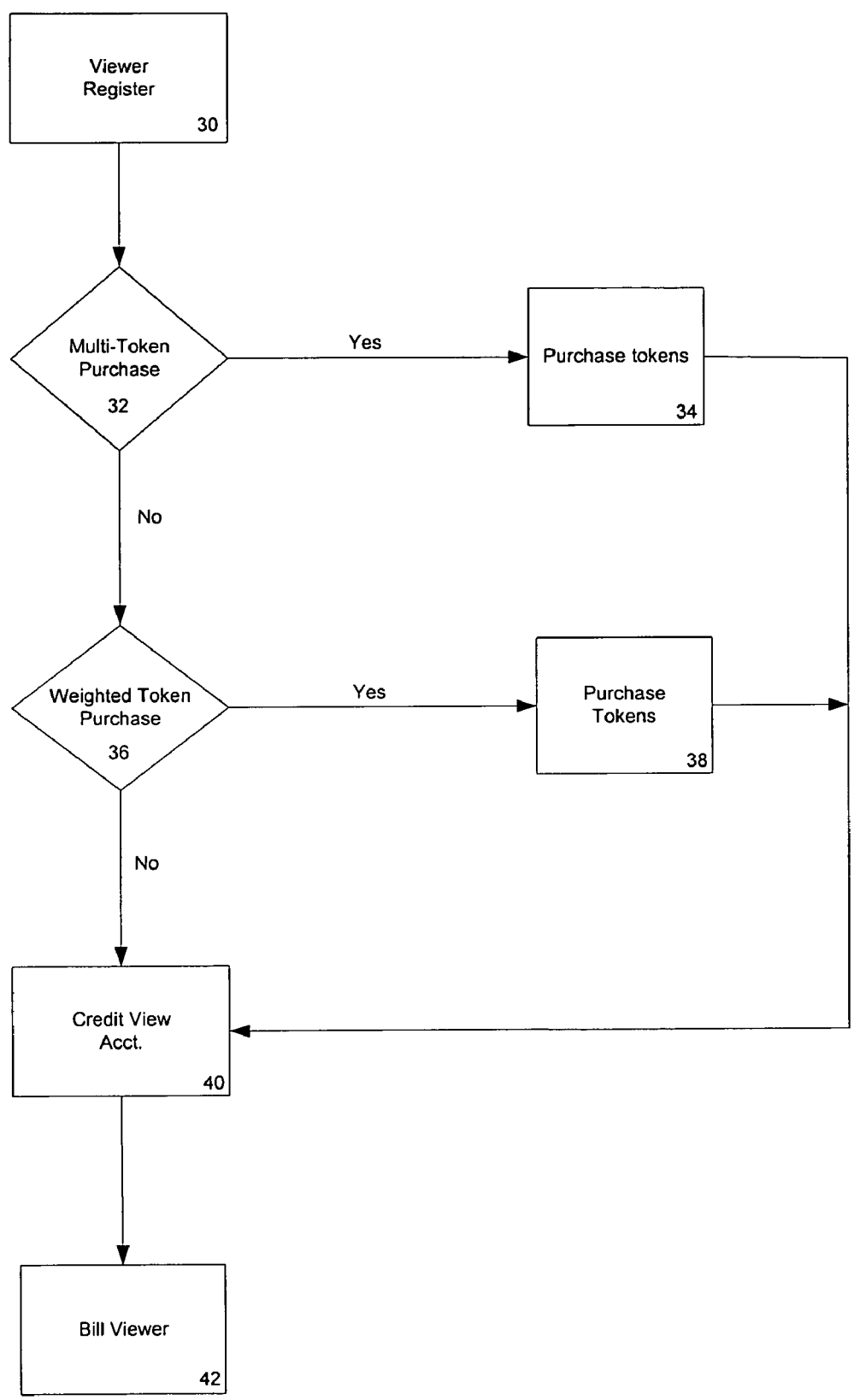
FIG. 2 illustrates the token purchase flow of the present invention.

Referring to FIG. 2, the token purchase flow of the present invention is illustrated. A network user, who may be a new network user on the network or an existing network user that simply wants to take advantage of the voting aspect of the present invention, registers with the network server 30. The network user is then asked if the network user wishes to purchase tokens 32. If the network user does wish to purchase tokens, the network user selects the number of tokens desired to be purchased 34. Each of the tokens has a monetary value. Depending upon the number of tokens purchased, the total token purchase is credited to the network user's account 40 and the network server bills the network user for the tokens purchased 42 in the usual fashion for billing for network use. Alternatively, and without limitation, network users can establish account with balances for the purchase of tokens, network users can be given tokens as incentives to use the system of the present invention thereby building loyalty, tokens can be won in a contest, tokens can be awarded based upon network user participation in other activities such as shopping, and other means.

If the network user does not desire to purchase multiple tokens, the network user is asked if the network user wants to purchase weighted tokens 36. Weighted tokens are individual tokens that carry a larger vote weight than other tokens. The network user can select from various token weight levels depending upon the interest that the network user has and the amount of money that the network user desires to spend. If the network user does desire to purchase weighted tokens, weighted tokens are purchased 38 and the network user's account is credited with the amount of tokens purchased 40. Again, the network user will be billed in the normal course for the tokens purchased 42.

If a network user does not desire to purchase any tokens, the network user simply answers no to all questions and the network user's account will not be credited with any voting tokens, nor will the network user be billed.

Thereafter, the network user is free to use the tokens during the course of any poll that is offered by the network as will be more fully explained below.

Figure 3:
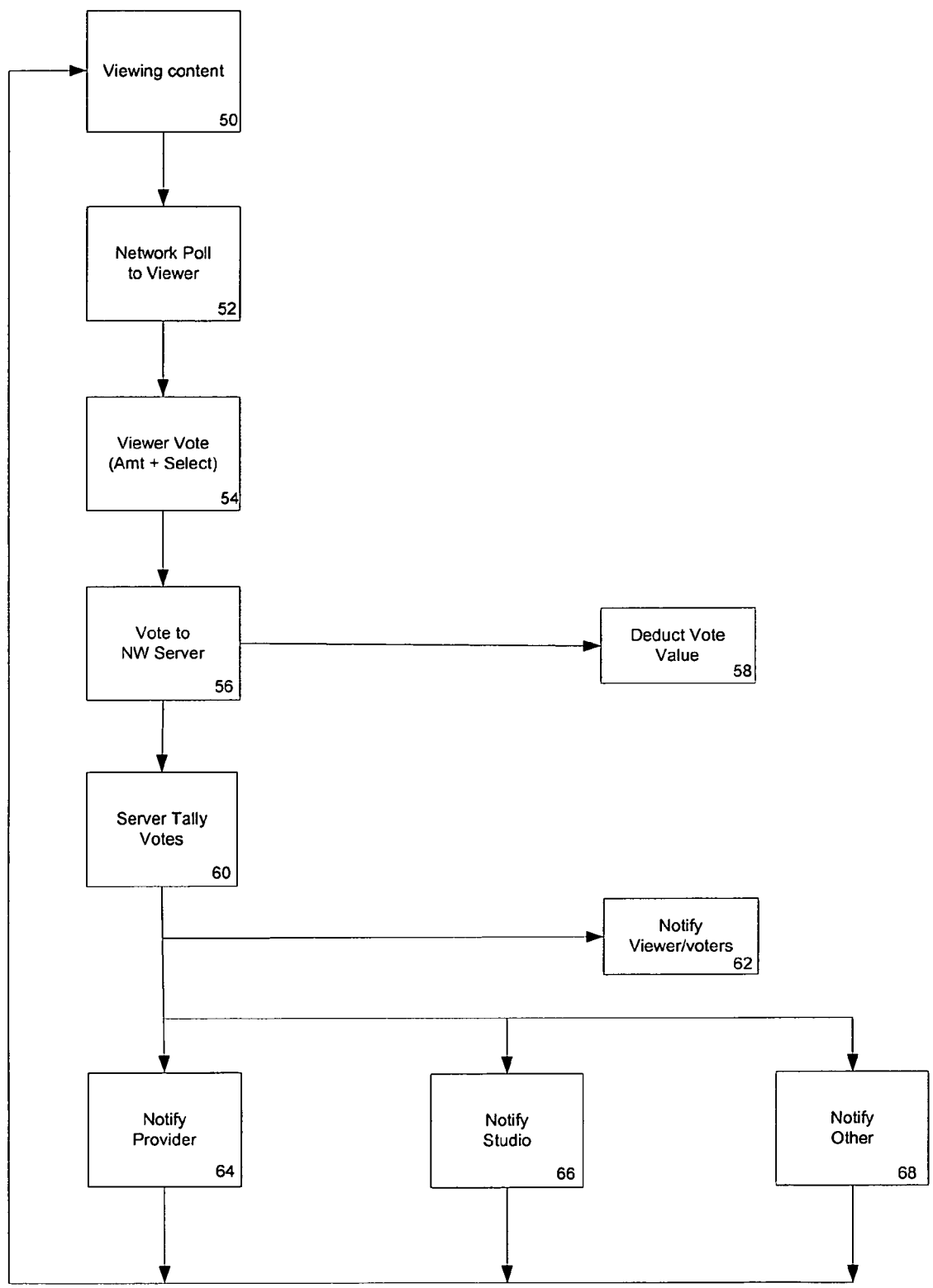
FIG. 3 illustrates the voting process and impact of the voting process.

Referring to FIG. 3, the voting process and impact of the voting process is illustrated. Network users view the content over the network 50. From time to time the network server of the present invention provides a poll to the network users 52 concerning various aspects of the content being shown. For example, if a live broadcast is being sent, the network users can be offered the ability to truncate interviews, move to a new topic, or other responses. In the event that a pre-recorded program is being shown that has optional elements, the network users can be polled to determine what elements they would like to see next in the content being shown.

Thereafter, network users, who have a token balance in their accounts can vote based upon the poll being offered to the network users 54. Network users can select the number of votes they wish to cast, and their selection with respect to the options offered. Alternatively, the poll can be structured, depending upon the desires of the content provider, to allow only one vote at a time by network users. The poll structure itself can be dictated by the content providers depending upon their desires for input and the ability of the content providers to modify the content being presented to the network users.

After an individual network user votes, the vote is recorded by the network server 56 and the vote or number of votes made by the particular network user is deducted from the network user account 58. The server also tallies all of the votes 60, and notifies the network users of the results of the vote 62. In this fashion, a community of network users can determine how their vote in a particular poll was made and the impact of that vote. The server also sends the tally of the votes to the appropriate content provider. Thus, if a content provider has optional content that will be provided based upon the votes, that content provider is notified 64. As another example, if a live studio feed is occurring, the server notes the tally of the votes to the live studio 66. Additionally, other types of content providers may desire to have vote tallies for a variety of reasons that would affect further programming, production of additional segments, and other factors 68. Based upon the votes made, the various content providers will modify the content being sent to the viewing audience and that content can be modified in real time or near real time and sent back to the network users who can then view that modified content 50. In this fashion, the network users can see how their votes have affected the actual content that is being provided to them.

Figure 4:
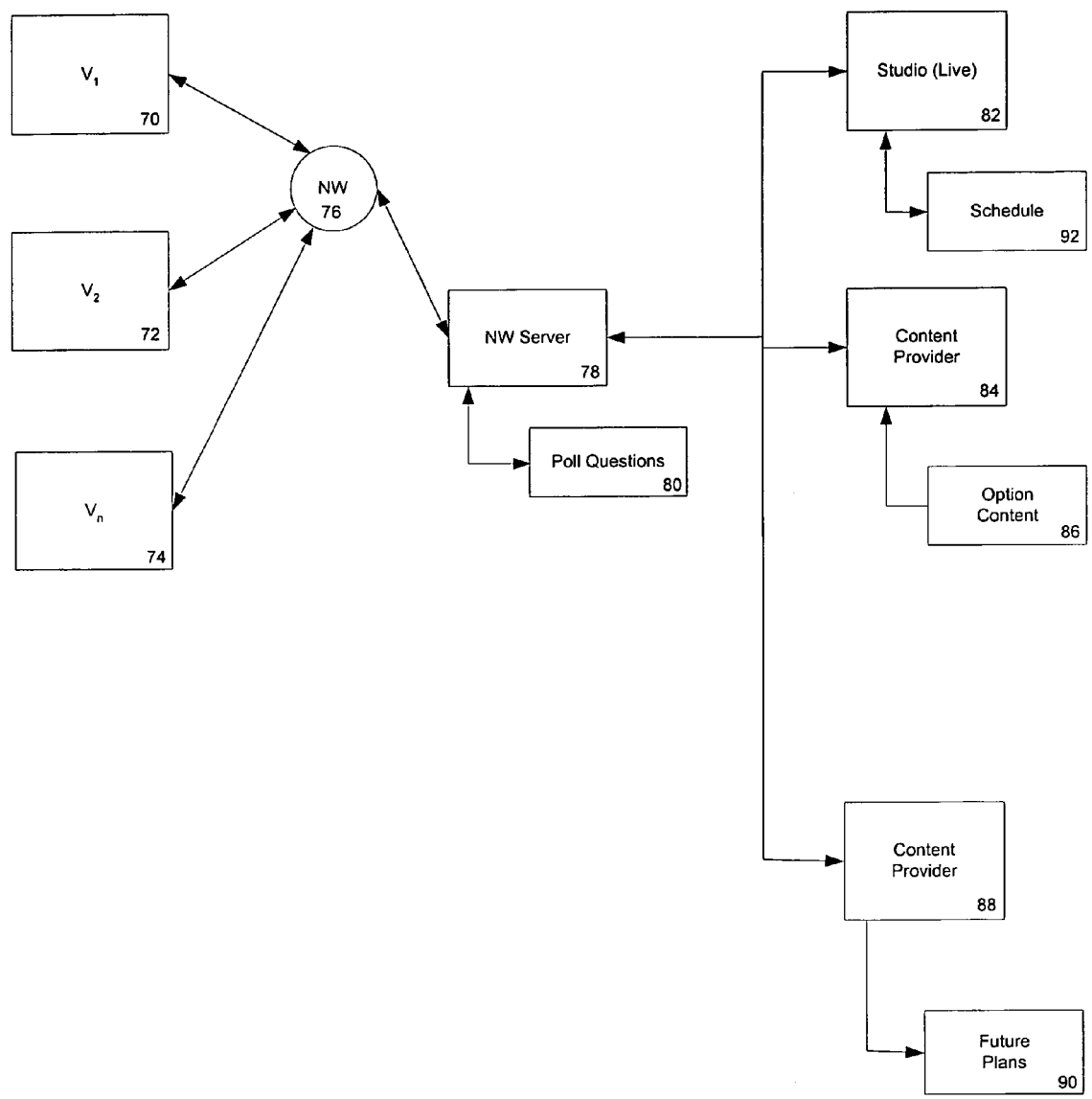
FIG. 4 illustrates the generalized architecture of the present invention.

Referring to FIG. 4, the generalized architecture of the present invention is illustrated. Network users 70, 72, and 74 are connected to a network 76 to receive video content and polling requests. It should be noted that while three network users are indicated in this figure, this is not meant as a limitation. For example, and as is well known, there are literally thousands of network users on a cable network as well as network users who may potentially receive video over the Internet. Thus, the network 76 is illustrative of both a cable television network as is normally known, and may also in certain instances be the Internet or other media access network where network users are viewing video content or other applicable media assets over the Internet or media access network.

As discussed herein the network can be a typical centralized network with broadcast of content coming from a central location. Alternatively, the network could potentially be a distributed network where the poll server defines the scope of the community. For example a poll server could be placed in each regional data center and at a national data center so that certain polls and content are applicable to all subscribers attached to the network or to just a small set with one poll servers. Thus a plurality of poll servers at different places in the network, and also a plurality of poll servers that can communicate with a Master poll server for those polls and content are equally considered to be within the scope of the present invention.

The network server 78 connects to the network users 70, 72, and 74 and provides video content to those network users. Network users register with the network server 78 for the desired service in the usual fashion. However, the network user's can also register for voting tokens that are offered by the network server 78. The network server may have its own content which it provides to network users, but is also connected to certain live studios 82 which provide a live video feed to network users via the network server. The studio has its own schedule of events 92 which relates to the schedule within a particular show as well as the schedule over any particular period of time, whether it be day month or year. The network service also connected to other content providers 84 which may provide pre-recorded content to network users. In certain instances, the content provider 84 may have optional content 86, which can be presented to network users depending upon the poll of the network users.

Similarly, other content providers 88 may also be connected to the server 78 and provide pre-recorded video content. For such providers, the polling of the present invention allows them to make future plans 90 for additional segments and/or productions that may be desired by the network users.

Depending upon the content that is provided by the various content providers 82, 84, and 88, the content providers may wish to solicit an interaction from the individual network users by virtue of poll questions. The poll questions to be posed by the network server 78 are provided by the content providers to the network server. The network server stores the poll questions 80 and schedule those poll questions to be displayed to the network users 70, 72, and 74 during appropriate times associated with the individual content provider content. Thus, during a live studio broadcast from a studio content provider 82 poll questions associated with the live studio feed are retrieved from a poll question database 80 and provided by the network server 78 to the network users 70, 72, and 74. The network users will then vote based upon the poll questions which vote will then be tallied by the network server 78. The network server 78 will then inform the studio 82 of the results of the poll as well as charge the individual network user accounts for the vote tokens used as noted earlier. Similarly, results from a different poll can inform content provider 84 as to which optional content 86 is to be fed to the network users.

Figure 5:
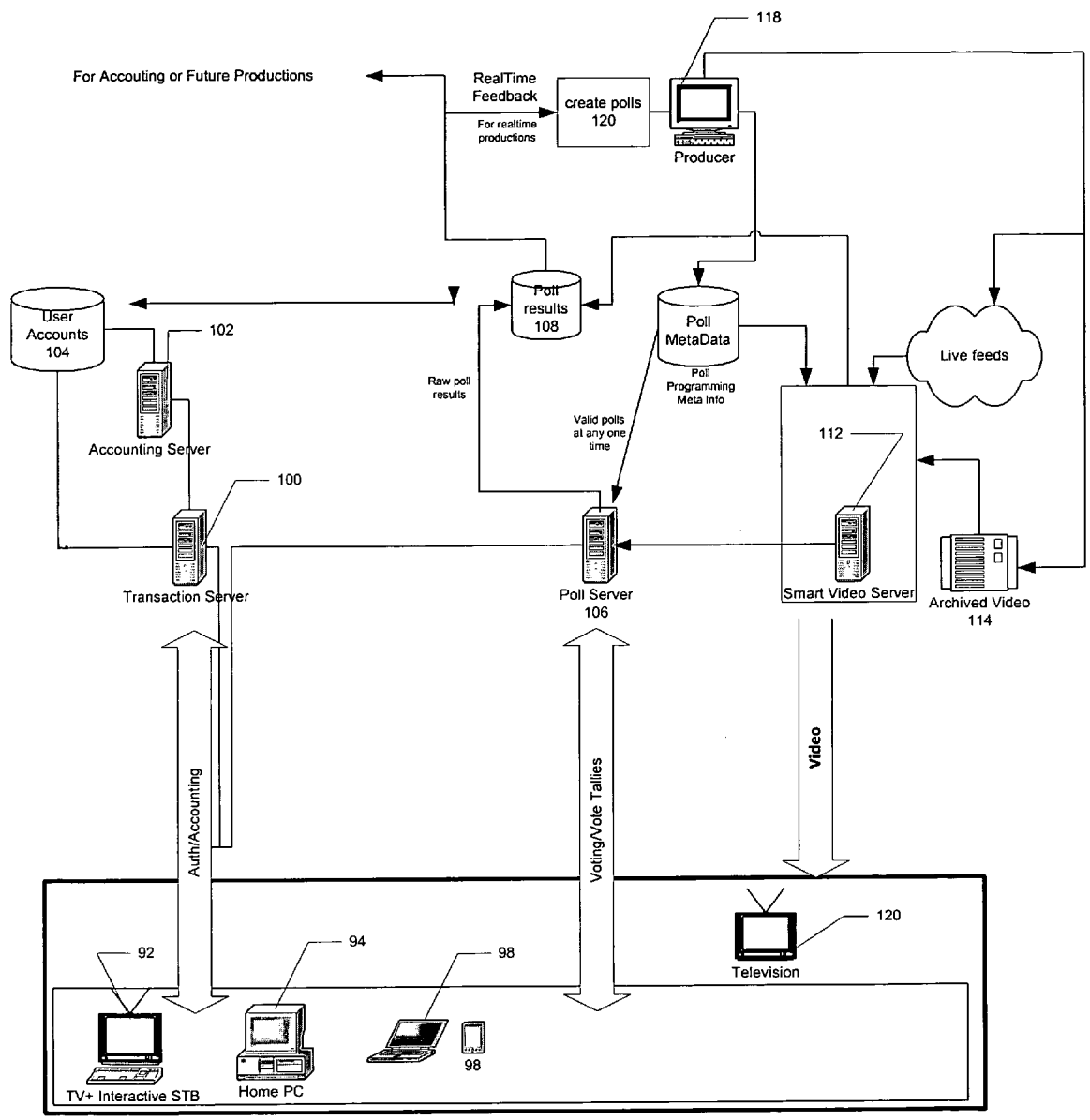
FIG. 5 Illustrates one of the preferred architectures of the present invention.

Referring to FIG. 5 the overall architecture of the present invention is illustrated. Interactive devices 92, 94, 96, 98 all represent different types of devices that interact in the community polling of the present invention. Various interactive devices may be a television with interactive set top box 92, home PC 94, wireless laptop 96 or other wireless device 98 log onto the transaction server 100 of the present invention. These devices are not meant as a limitation. Any device now or in the future that has an interactive capability will be suitable for use with the present invention. The transaction server informs the poll server 106 that a valid user exists on the system and the amount of vote tokens that are possessed by the valid user. The poll server stores this information for subsequent voting by the users.

If the users desire to purchase tokens, an accounting server 102 accesses user accounts 104 for financial information that relates to the purchase of tokens, such as credit card access and other information allowing tokens to be purchased.

When a time for a polling takes place, users are informed of the polling via explicit coupling in the video stream or through other polling means. Thereafter users use their tokens to vote in a particular poll which vote is communicated to the poll server 106. The poll server receives the votes of individual users and stores those poll results 108. After all votes are taken, the poll server provides the vote tallies back to the users 92, 94, 96, 98 so that such clients can be informed of the poll results.

The system of the present invention also comprises a smart video server 112. This smart video server 112 receives programming from various sources which have been modified in response to the polling that has taken place. For example, live feeds 116 can be served over the smart video server 112 or archived video 114 can be served to users based upon the voting of the viewers. The programs and content are then sent to the television 120 or other device 92, 94, 96, 98. It is important to note that while this diagram depicts video as the shared content, the actual content can be any form of communication such as audio, radio, or games all of which will be served to community of users. Poll meta data 110 that is information concerning the polls that are to be presented are provided to the poll server. This information can be the number of times and times of day that a particular poll is to be made and other information concerning the poll. Producer 118 provides information to the poll meta data database 110 concerning when any particular poll is to be served to users. Information concerning poll results from the poll results data base 108 are served to various sponsors for accounting purposes, and for planning future production. Such accounting functions are in order to report when particular polls have been played in order to report contract fulfillment. In addition, poll results 108 provide real time feedback to create new polls 120 which producer 118 can subsequently serve to the poll server 106.

The system and method for influencing community shared elements of a broadcast via a polling system can be used in a variety of ways, such as talk shows (radio or TV), game shows (play along), court shows (you play the part of the judge), improv comedy, improv acting, food show, dare contest/candid camera, obstacle course where you can control dynamic obstacle placements, choose camera, choose character to trail, interview, live act show, concert (song requests), radio station, live act contest, animal show, virtual government, behind the scenes, outtakes, director's cut, controlling order of news clips, controlling whether to expound upon the last news topic, controlling whether to expound upon any element before continued with the main narrative, ad selection, controlling point of sale commerce, controlling inventory volume, choosing camera angle, camera style/digital effect, concert, interview, travel show, filtering massive datastores of content into a network user-structured programming order, soap opera plot, series plot, movie plot, chat room topics, or control someone's daily life (AI/consensus generates options as the person goes about daily life). Environment aspects of gaming environments can be controlled by this system and method such as battles outcome, luck enhancement, skew natural event probability weights, skew AI event probability weights, or, balance of power in the universe. The effectors could be any of the following elements: camera angle, directorial style, camera effect, questions, answers, plot path, point of view, location/weather, aesthetics, objects in environment, luck/fate/chance probabilities, behavioral aspects over time.

As yet another embodiment of the present invention the server of the present invention allows the creation of a 'buddy list' for users whereby users can form a communitywithin-community (a "Sub-community"). Using the buddy list, individual users who are on one another's buddy list can view in real time how their sub-community is voting on any program. This further adds weight for the sub-community in its voting since, if the individuals are like-minded, they can vote as a block for the effect desired on the programming.

As part of the ability to vote as a block, the server of the present invention allows for a "pre-vote by the sub-community to see how like-minded the individuals really are. In this way the sub community can adjust its vote as desired to more fully affect the course of programming.

After voting has been completed, statistics are presented to both the community and the sub-community so that the voting trends of the group and subgroup can be viewed.

As part of the present invention network users responses and histories are saved to provide targeted advertising and programming. This could be accomplished by associating the typical demographic information with poll responses. Such advertising can be accomplished on an anonymous basis since the system of the present invention can target advertising at the community members without violating the privacy of the network users. For example an abstracted unique identifier associated with a network user's voting patterns with polls with questions that would lead advertisers to believe with high probability that the particular network user would want to buy their products. Advertisers could then choose the content of the polling questions that are indicative of network user preferences. Advertisers could then be offered (sold) polling opportunities for their questions in much he same way the advertising space is sold with the polling results made available to the advertiser purchasing the polling opportunity.

The present invention will also find utility in the world of on-line gaming. For example, in the shared gaming universe, the poll weighting can potentially affect multiple perspectives of the gaming universe, such that the changes affects different members of the community differently depending on their point of view within that gaming universe.

A system and method for influencing community shared elements of a broadcast via a polling system has been illustrated. It will be appreciated by those skilled in the art that other elements may be added to the system of the present invention without departing from the scope of the invention as disclosed.

We claim:

1. A method for influencing dynamic community shared elements of broadcast content comprising:
   a plurality of participants obtaining electronic votes that they may later cast, wherein the electronic votes are obtained independent of a poll;
   a polling server periodically polling the plurality of participants over a network for their opinion concerning the broadcast content;
   the plurality of participants casting their respective electronic votes concerning the broadcast content via the network;
   the polling server receiving the electronic votes of the participants, tallying the electronic votes and reporting those results to a content server;
   content server receiving the votes and retrieving content based upon the opinion expressed by a majority of electronic votes; and
   delivering the retrieved content to the participants.

2. The method for influencing dynamic community shared elements of broadcast content of claim 1 wherein the content is selected from the group consisting of audio, video, on-line games and text.

3. The method for influencing dynamic community shared elements of broadcast content of claim 1 wherein the content is created in real time.

4. The method for influencing dynamic community shared elements of broadcast content of claim 1 wherein the content is stored content.

5. The method for influencing dynamic community shared elements of broadcast content of claim 1 wherein obtaining electronic votes comprises the participants purchasing the electronic votes over the network.

6. The method for influencing dynamic community shared elements of broadcast content of claim 1 wherein the obtaining electronic votes comprises the participants being given the electronic votes.

7. The method for influencing dynamic community shared elements of broadcast content of claim 1 wherein the obtaining electronic votes comprises the participants purchasing electronic votes of differing values per vote over the network.

8. The method for influencing dynamic community shared elements of broadcast content of claim 1 further comprising the polling server providing the results of the electronic votes cast by the participants over the network.

9. The method for influencing dynamic community shared elements of broadcast content of claim 1 further comprising the plurality of participants forming sub-communities of participants for voting purposes.

10. The method for influencing dynamic community shared elements of broadcast content of claim 9 further comprising the sub communities pre-voting over the network to determine the direction of the sub-communities voting.

11. The method for influencing dynamic community shared elements of broadcast content of claim 1 further comprising the polling server reporting to the sub-community the results of the sub-community's voting over the network.

12. The method for influencing dynamic community shared elements of broadcast content of claim 1 wherein the network is the Internet.

13. The method for influencing dynamic community shared elements of broadcast content of claim 1 wherein the network is a cable TV network.

14. The method for influencing dynamic community shared elements of broadcast content of claim 1 wherein the network is an RF network.

15. The method for influencing dynamic community shared elements of broadcast content of claim 1 wherein the network comprises a wired network and a wireless network, and wherein the participant vote via the wireless network.

16. A system for influencing dynamic community shared elements of broadcast content comprising:
   a plurality of participant devices each associated with a participant connected to a network, the participant devices further comprising instructions for obtaining and casting electronic votes;
   a transaction server connected to the network further comprising instructions for receiving requests from the participant devices to obtain electronic votes, and instructions for delivering electronic votes to the participant devices over the network independent of a poll sent by a polling server;
   the polling server connected to the network for receiving the electronic votes from the participant devices in response to polls sent by the polling server;

the polling server further comprising instructions for receiving and tallying the electronic votes received from the participant devices, and reporting the tally; and a content server connected to the polling server for receiving the tally of the electronic votes, the content server further comprising instructions for modifying content served to the participant devices in response to the tally of electronic votes.

17. The system for influencing dynamic community shared elements of broadcast content of claim 16 wherein the content is selected from the group consisting of audio, video, online games and text.

18. The system for influencing dynamic community shared elements of broadcast content of claim 16 wherein the content is created in real time.

19. The system for influencing dynamic community shared elements of broadcast content of claim 16 wherein the content is stored content.

20. The system for influencing dynamic community shared elements of broadcast content of claim 16 wherein the electronic votes are purchased by the participant via the participant device by the transaction server over the network.

21. The system for influencing dynamic community shared elements of broadcast content of claim 16 wherein the electronic votes are given to the participant devices by the transaction server over the network.

22. The system for influencing dynamic community shared elements of broadcast content of claim 16 wherein the electronic votes comprise votes of different values.

23. The system for influencing dynamic community shared elements of broadcast content of claim 16 wherein participant devices further comprise instructions for casting the electronic votes in response to a poll served by the polling server.

24. The system for influencing dynamic community shared elements of broadcast content of claim 16 wherein the polling server further comprises instructions for reporting the results of the voting to the participant devices over the network.

25. The system for influencing dynamic community shared elements of broadcast content of claim 16 wherein the polling server further comprises instructions for receiving requests from participant devices to form a sub-community of participant devices.

26. The system for influencing dynamic community shared elements of broadcast content of claim 25 wherein the polling server further comprises instructions for permitting a pre-vote of the sub-community on a given poll.

27. The system for influencing dynamic community shared elements of broadcast content of claim 26 wherein the polling server further comprises instructions for reporting the sub-community vote to the participant devices of the sub-community.

28. The method for influencing dynamic community shared elements of broadcast content of claim 7, wherein the plurality of participants casting their respective electronic votes comprises the plurality of participants casting their respective electronic votes of differing values per vote.

29. The method for influencing dynamic community shared elements of broadcast content of claim 1, wherein the plurality of participants obtaining electronic votes comprises the plurality of participants obtaining electronic votes before receipt of the poll from the polling server.

30. The method for influencing dynamic community shared elements of broadcast content of claim 1, wherein the plurality of participants obtaining, electronic votes comprises the plurality of participants obtaining electronic votes after receipt of the poll from the polling server.

31. A method for influencing dynamic community shared elements of broadcast content comprising:
   obtaining via a network an electronic vote for a participant account, wherein the vote may be cast at a later time and wherein the electronic vote is independent of a poll;
   issuing the poll from a polling server to a participant device via the network for an opinion concerning the content of a program;
   casting the electronic vote obtained for the participant account from the participant device to express the opinion concerning the content of the program via the network;
   receiving at the polling server the electronic vote from the participant device, tallying the electronic vote, and reporting a result to a content server, and
   receiving at the content server the result and retrieving content based upon the result.

32. A method for making choices by a group of participants comprising:
   obtaining via a network an electronic vote for a participant account at a participant device, wherein the vote may later be cast and wherein the electronic vote is independent of an opportunity to select a choice;
   presenting the participant device the opportunity to select a choice from a group of choices;
   casting the electronic vote obtained for the participant account from the participant device to express the choice made;
   receiving the electronic vote from the participant device, tallying the electronic vote, and reporting a result to a content server; and
   retrieving a selected choice from the group of choices based upon the result.

33. A system for making choices by a group of participants comprising;
   a participant device connected to a network, wherein the participant device is adapted to:
      receive a poll from a polling server presenting the participant an opportunity to select a choice from a group of choices;
      obtain an electronic vote for a participant account associated with a participant, wherein the vote may cast at a later time, and wherein the electronic vote is independent of the opportunity to select the choice;
      cast the electronic vote to express the selection made; and
   the polling server adapted to:
      periodically poll the participant device over the network to provide the opportunity to select the choice;
      receive the electronic vote from the participant device;
      tally the electronic vote from other participant devices; and
      report a result to a selection server; and
   the selection server adapted to:
      receive the result from the polling server,
      retrieve a selected choice from the group of choices based upon the result; and
      deliver the selected choice to the participant device.

* * * * *